Dec. 18, 1962  F. W. GEE  3,069,640
INDUCTIVE WINDINGS
Filed March 30, 1961
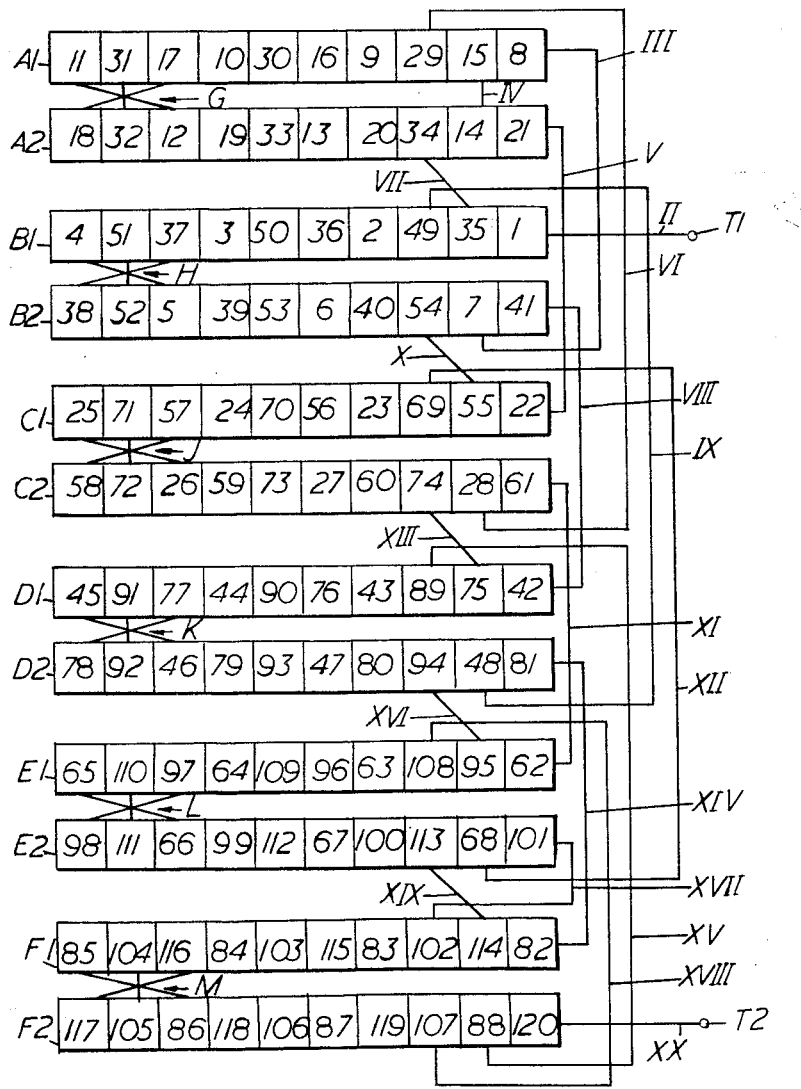
Inventor
FRANK W. GEE

United States Patent Office 3,069,640
Patented Dec. 18, 1962

3,069,640
INDUCTIVE WINDINGS
Frank Watson Gee, Worsley, Walkden, Manchester, England, assignor to Ferranti, Limited, Hollinwood, Lancashire, England, a company of Great Britain and Northern Ireland
Filed Mar. 30, 1961, Ser. No. 99,618
Claims priority, application Great Britain Apr. 7, 1960
1 Claim. (Cl. 336—69)

This invention relates to inductive windings suitable for use, for example, in transformers.

In transformers in which a winding is likely to be subjected to steep-fronted voltage surges due, for example, to lightning strikes on a line to which the transformer is connected, it is advantageous to make the series capacitance of the winding as large as possible to cause the voltage distribution to be even over the winding as a whole.

It is accordingly an object of the present invention to provide an inductive winding having an improved series capacitance.

According to the present invention an inductive winding includes a group of pairs of disc coils spaced apart along a common axis, said group comprising two initial pairs, one final pair and at least one intermediate pair, each of said disc coils being wound from three conductors such that any one conductor is adjacent to, but insulated from, at least one of the other conductors, the inner ends of the three conductors of one coil of each pair being electrically connected to the inner ends of the three conductors of the other coil of the pair, the outer ends of the pairs of coils being electrically interconnected in such manner that a conductive path is formed which, after passing through any one of said intermediate pairs of coils for a first time, passes once through each of the two preceding pairs of coils, once through the next succeeding pair of coils, once again through the immediately preceding pair of coils and thereafter passes through said one pair of coils a second time, thereby introducing additional series capacitance between each pair of adjacent disc coils in said group.

One embodiment of the present invention will now be described by way of example with reference to the accompanying drawing which shows a radial sectional elevation of an inductive winding in accordance with the invention.

Referring now to the drawing, the winding shown has a group of pairs of disc coils spaced apart along a common axis (not shown) which is to the left of the drawing. The group comprises two initial pairs of coils A and B, one final pair of coils F, and three intermediate pairs of coils C, D and E. Each of the coils is wound from three conductors such that any one conductor is adjacent to, but insulated from at least one of the other conductors. Thus, in the coil A1 the turns numbered 8, 9, 10 and 11 are formed from a first conductor, the turns numbered 15, 16 and 17 are formed from a second conductor, and the turns numbered 29, 30 and 31 are formed from a third conductor. The inner ends of the three conductors of one coil of each pair are connected to the inner ends of the three conductors of the other coil of the pair by cross-connections designated generally at G, H, J, K, L and M. In practice the pairs of coils are wound as double disc coils so that the cross-connections G . . . M are continuations of the conductors forming the turns of the coils, and no mechanical joins have to be made at the inner ends of the coils.

Hereafter, reference will be made to the first, second and third conductor in each coil and it should be understood that the first conductor is the conductor forming the outermost turn of the coil, the second conductor is the conductor forming the turn adjacent the outermost turn, and the third conductor is the conductor forming the next turn.

The outer ends of the pairs of coils A . . . F are interconnected in the following manner. The end of the first conductor of coil B1 is connected to a terminal T1 by a connection II. The second conductor of the coil B2 is connected to the first conductor of the coil A1 by a connection III, and the second conductor of the coil A2 is connected to the second conductor of the coil A1 by a connection IV. The first conductor of the coil A2 is connected to the first conductor of the coil C1 by a connection V and the second conductor of the coil C2 is connected to the third conductor of the coil A1 by a connection VI. The third conductor of the coil A2 is connected to the second conductor of the coil B1 by a connection VII and the first conductor of the coil B2 is connected to the first conductor of the coil D1 by a connection VIII. The second conductor of the coil D2 is connected to the third conductor of the coil B1 by a connection IX and the third conductor of the coil B2 is connected to the second conductor of the coil C1 by a connection X. The first conductor of the coil C2 is connected to the first conductor of the coil E1 by a connection XI and the second conductor of the coil E2 is connected to the third conductor of the coil C1 by a connection XII. The third conductor of the coil C2 is connected to the second conductor of the coil D1 by a connection XIII and the first conductor of the coil D2 is connected to the first conductor of the coil F1 by a connection XIV. The second conductor of the coil F2 is connected to the third conductor of the coil D1 by a connection XV and the third conductor of the coil D2 is connected to the second conductor of the coil E1 by a connection XVI. The first conductor of the coil E2 is connected to the third conductor of the coil F1 by a connection XVII and the third conductor of the coil F2 is connected to the third conductor of the coil E1 by a connection XVIII. The third conductor of the coil E2 is connected to the second conductor of the coil F1 by a connection XIX and the first conductor of the coil F2 is connected to a terminal T2 by a connection XX.

By interconnecting the outer ends of the pairs of coils A . . . F in the manner just described a conductive path is formed the consecutive turns of which are designated by the numerals 1 to 120. From these numerals it will be seen that the conductive path, after passing through any one of the intermediate coils C, D or E passes once through each of the two preceding pairs of coils, once through the next succeeding pair of coils, once again through the immediately preceding pair of coils, and thereafter passes through the one pair of coils a second time. For example, considering the pair of coils D, the conductive path passes a first time through these by way of turns 42 to 48. The conductive path then follows the connection IX through the pair of coils B by way of turns 49 to 54, the connection X through the pair of coils C by way of turns 55 to 61, the connection XI, through the pair of coils E by way of turns 62 to 68, the connection XII, once again through the pair of coils C by way of turns 69 to 74 and thereafter passes a second time through the pair of coils D by way of turns 75 to 81.

It will be appreciated that the initial pairs of coils A and B and the final pair of coils F are necessary for leading the conductive path into and out of the intermediate pairs of coils C, D and E.

In inductive windings of the kind described above consecutive turns of the conductive path are separated from each other by further turns and therefore the series capacitance of such windings is greater than that of windings in which consecutive turns of the conductive path are adjacent to each other. The series capacitance is further improved since each pair of disc coils is effectively interleaved with the adjacent pairs thereby introducing additional series capacitance between each pair of adjacent disc coils in the group.

Windings in accordance with the invention may include any desired number of intermediate pairs of disc coils to give a winding having the required number of turns, and each coil may have any desired number of turns. Furthermore, the outer ends of the pairs of coils may be interconnected in a different manner from that described above to produce a winding in accordance with the invention.

What we claim is:

An inductive winding including a group of pairs of disc coils spaced apart along a common axis, said group comprising two initial pairs, one final pair and at least one intermediate pair, each of said disc coils being wound from three conductors such that any one conductor is adjacent to, but insulated from, at least one of the other conductors, the inner ends of the three conductors of one coil of each pair being electrically connected to the inner ends of the three conductors of the other coil of the pair, the outer ends of the pairs of coils being electrically interconnected in such manner that a conductive path is formed which, after passing through any one of said intermediate pairs of coils for a first time, passes once through each of the two preceding pairs of coils, once through the next succeeding pair of coils, once again through the immediately preceding pair of coils and thereafter passes through said one intermediate pair of coils a second time, thereby introducing additional series capacitance between each pair of adjacent disc coils in said group.

No references cited.